United States Patent [19]

Wakisaka et al.

[11] Patent Number: 5,740,336
[45] Date of Patent: Apr. 14, 1998

[54] FACSIMILE/PRINTER DEVICE HAVING AN LCD FOR SEPARATELY DISPLAYING INFORMATION ABOUT FACSIMILE AND PRINTER OPERATIONS

[75] Inventors: Noriko Wakisaka, Bisai; Wataru Tomida, Owariasahi, both of Japan

[73] Assignee: Brother Kogyo Kabushiki Kaisha, Nagoya, Japan

[21] Appl. No.: 609,873

[22] Filed: Mar. 1, 1996

[30]     Foreign Application Priority Data

Mar. 2, 1995   [JP]   Japan ................... 7-043026

[51] Int. Cl.⁶ ................................................. H04N 1/32
[52] U.S. Cl. ..................... 395/113; 358/442; 358/468
[58] Field of Search ........................ 358/400, 434, 358/442, 468; 395/114, 113; 399/81–82, 85; H04N 1/32

[56]     References Cited

U.S. PATENT DOCUMENTS

| | | |
|---|---|---|
| 5,070,467 | 12/1991 | Todome . |
| 5,477,338 | 12/1995 | Fujii et al. ........................ 358/468 |
| 5,592,307 | 1/1997 | Murai ................................ 358/468 |

*Primary Examiner*—Kim Vu
*Attorney, Agent, or Firm*—Oliff & Berridge, PLC

[57]     ABSTRACT

To display in a distinguishable way information pertaining to facsimile operation and printer operation, a liquid crystal display has an upper and lower level display areas. Based on a display process by a FAX CPU, the upper level displays information pertaining to facsimile operation and the lower level displays information pertaining to printer operation.

22 Claims, 12 Drawing Sheets

FACSIMILE/PRINTER DEVICE HAVING AN LCD FOR SEPARATELY DISPLAYING INFORMATION ABOUT FACSIMILE AND PRINTER OPERATIONS

BACKGROUND OF THE INVENTION

1. Field of the Invention

The present invention relates to a facsimile device with printer function capable of printing an image on a recording paper upon receipt of code data that is output from a computer or other device.

2. Description of the Related Art

General facsimile devices are provided with a facsimile function portion which carries out driving control of an image forming device according to facsimile data (hereinafter referred to as "fax data") transmitted via a telephone line or the like. A facsimile device with printer function uses its image forming device to print code data (hereinafter referred to as "PC data") that is output from a computer or other device. The facsimile device with printer function is constructed by providing a printer function portion in a general facsimile device. The printer function portion carries out driving control of the image forming device according to PC data that is input via a printer cable or the like.

For such facsimile devices with printer function, it has been proposed to display information pertaining to operation of the facsimile function portion or the printer function portion (for example, setting state, error messages, etc.) by lighting up a corresponding LED. However, display by LEDs is inconvenient since the information displayed by each of the LEDs must be checked one by one. One possible solution to this problem is to indicate information by letters or numerals using a liquid crystal display (LCD) or the like.

However, the information to be indicated on the LCD may pertain to either operation of the facsimile function portion (hereinafter referred to as "facsimile information"), or operation of the printer function portion (hereinafter referred to as "printer information"), or operation common to both the facsimile function portion and the printer function portion (hereinafter referred to as "common information"). As a result, it may not be possible to determine which function portion the information pertains to if the information is displayed by a single display.

For example, notwithstanding the fact that the displayed error message pertains only to the printer function and so the facsimile function portion is still usable, the operator may erroneously recognize so that the error message is issued with respect to both the printer function portion and the facsimile function portion. Therefore, the operator may refrain from using the facsimile function portion even if it is still operable.

SUMMARY OF THE INVENTION

In view of the foregoing, it is an object of the present invention to provide a facsimile device with printer function that is capable of displaying information pertaining to operation of a facsimile function portion and a printer function portion so that the information details and which function portion the information corresponds to are easily understandable.

To achieve the above and other objects, there is provided a device having both a facsimile function and a printer function, which includes a recording section having an input for receiving data to be recorded on a recording sheet, a facsimile section communicatable with a remote facsimile device, a printer section operatively connected to an external device, a first display and a second display. The facsimile section functions as a facsimile device by receiving facsimile data from the remote facsimile device and applying the facsimile data to the input of the recording section to record the facsimile data on the recording sheet. The printer section is operatively connected to an external device, such as a personal computer, and functions as a printing device by receiving print data from the external device and applying the print data to the input of the recording section to record the print data on the recording sheet. The first display is provided for displaying selected one of three kinds of information consisting of first information about operations pertaining to the facsimile section, second information about operations pertaining to the printer section, and third information about operations common to both the facsimile section and the printer section. The second display is provided for displaying either one of two information which remain non-selected as a result of selection for the first display.

The first information contains a predetermined number of information pieces corresponding to the operations pertaining to the facsimile section, the second information contains a predetermined number of information pieces corresponding to the operations pertaining to the printer section, and the third information contains a predetermined number of information pieces corresponding to the operations common to both the facsimile section and the printer section.

Preferably, the first display and the second display form a single display unit having a display region separated into a first display region awarded to the first display and a second display region awarded to the second display. This single display unit is made from a liquid crystal display, and the information displayed therein are represented by letters or symbols.

Sensing means is further provided for sensing the operations of the facsimile section and the printer section. Information displayed in the first display and the second display include statuses of the facsimile section and the printer section and error messages corresponding to operational errors of the facsimile section and the printer section.

In accordance with another aspect of the present invention, there is provided a device having both a facsimile function and a printer function, which includes a recording section, a facsimile section, a printer section, storage means, a first display, a second display and a control means. The recording section has an input for receiving data to be recorded on a recording sheet. The facsimile section is communicatable with a remote facsimile device wherein the facsimile section receives facsimile data from the remote facsimile device and applies the received data to the input of the recording section to record the facsimile data on the recording sheet. The printer section is operatively connected to an external device, such as a personal computer or a wordprocessor, and receives print data from the external device and applies the received data to the input of the recording section to record the print data on the recording sheet. The storage means is provided for separately storing three kinds of information consisting of first information, second information and third information. The first information is about operations pertaining to the facsimile section. The second information is about operations pertaining to the printer section. The third information is about operations common to both the facsimile section and the printer section. The control means controls the first display and the second display to display selected one of the three kinds of information in the first display and to display either one of two information which remain non-selected as a result of selection for the first display in the second display, based on the three kinds of information stored in the storage means.

Sensing means may further be provided for sensing operational errors of the facsimile section and the printer section. In such a case, information displayed in the first display and in the second display are error messages corresponding to operational errors of the facsimile section and the printer section.

The control means discriminates error messages vis-a-vis the three kinds of information prior to storing the error messages in the storage means. The first information contains a predetermined number of error messages corresponding to the operations pertaining to the facsimile section, the second information contains a predetermined number of error messages corresponding to the operations pertaining to the printer section, and the third information contains a predetermined number of error messages corresponding to the operations common to both the facsimile section and the printer section.

The first display and the second display form a single display unit having a display region separated into a first display region awarded to the first display and a second display region awarded to the second display. The error messages displayed in the first display and the second display are represented by letters or symbols.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described while referring to the accompanying drawings. Throughout the following description, the expression "front", "rear", "top" and "below" are used to define the various parts when a facsimile device is disposed in an orientation in which it is intended to be used.

Figure 2:
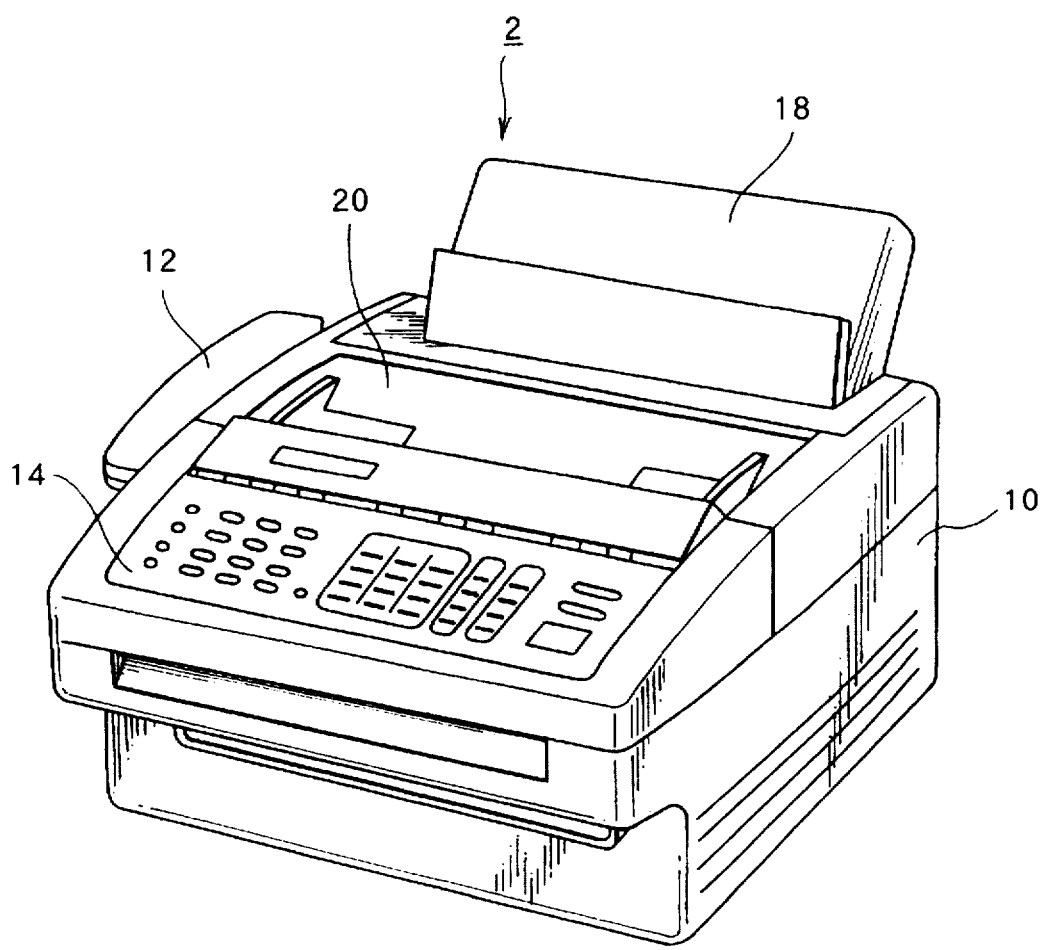
FIG. 2 is a perspective view showing an external view of a facsimile device according to the embodiment of the present invention.
Figure 3:
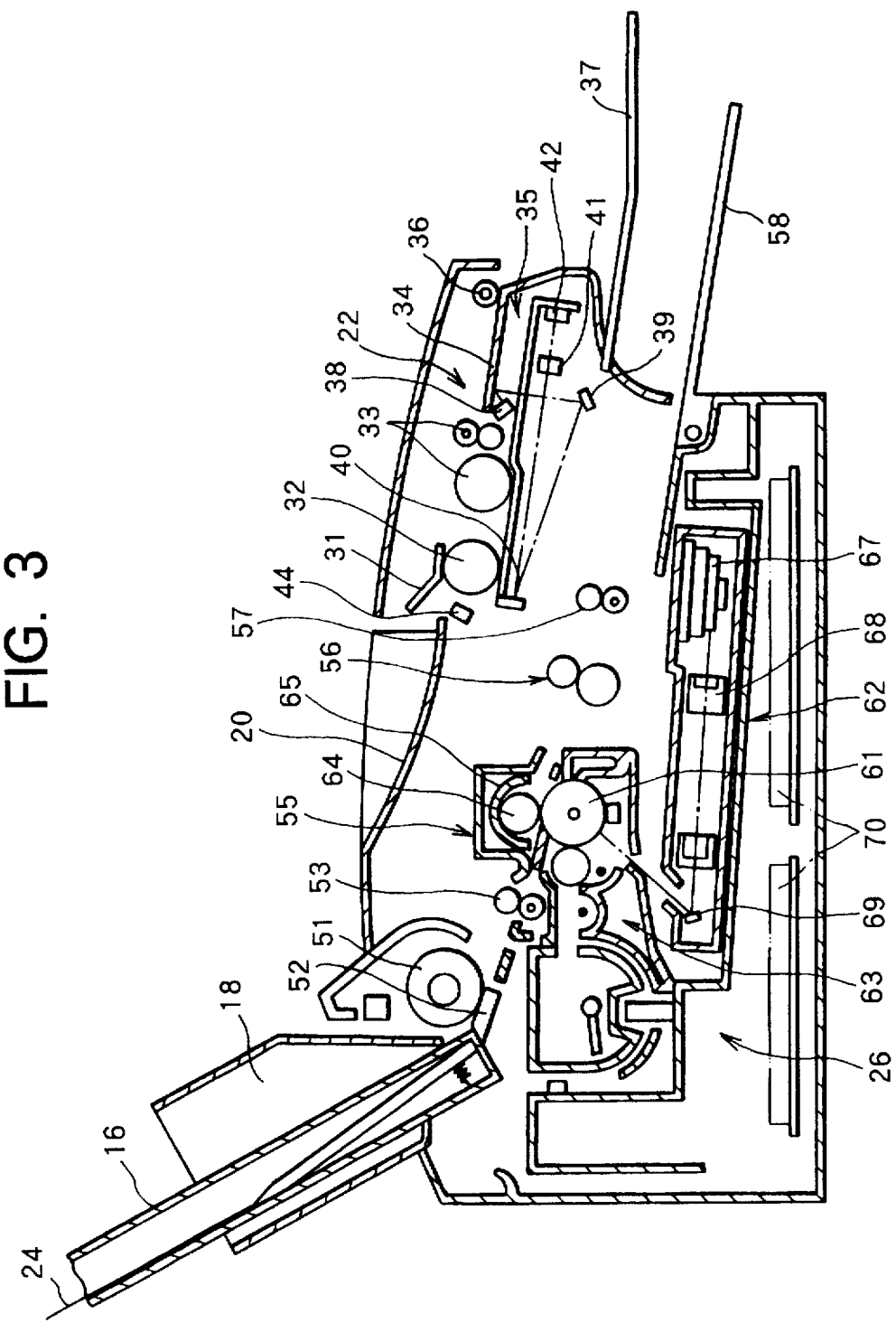
FIG. 3 is a cross-sectional view showing an interior structure of a facsimile device according to the embodiment of the present invention.

FIG. 2 is a perspective view showing an exterior view of a facsimile device 2 according to an embodiment of the present invention. FIG. 3 is a cross-sectional view showing an interior structure of the facsimile device 2.

The facsimile device 2 has a facsimile function and a printer function. The facsimile function is provided to general facsimile devices 2. The facsimile function includes reading an image from an original sheet and transmitting the image data as facsimile data to another facsimile device via a telephone line, and receiving facsimile data (fax data) transmitted from another facsimile device via a telephone line and reproducing the image on a recording paper. The printer function includes receiving code data (PC data) transmitted via a printer cable from a personal computer (PC), word processor or other device and then printing an image on the recording paper according to the PC data.

As shown in FIG. 2, the facsimile device 2 has a main body 10, on a side portion of which is mounted a telephone receiver 12. An operation panel 14 is provided on a top surface of a front portion of the main body 10. A cassette tray insertion portion 18 is formed on a top surface of a rear portion of the main body 10 for inserting a paper cassette tray 16 (refer to FIG. 3). A sheet holder 20 is formed on a top surface of a central portion of the main body 10. A stack of original documents which contain information to be transmitted are placed in the sheet holder 10.

On the other hand, as shown in FIG. 3, a scanner portion 22, recording portion 26, and a control section 70 are incorporated in the main body 10. The scanner portion reads an image from a document placed in the sheet holder 20. The recording portion 26 forms an image on a recording paper 24 contained in the paper cassette tray 16. The control section 70 carries out driving control of each of the scanner portion 22 and the recording portion 26 to thereby execute the facsimile and printer functions.

Original documents placed in the sheet holder 20 are taken into the scanner portion 22 one sheet at a time by means of a feed mechanism formed from a feed roller 32, a separation pad 31, and other components. Next, the original document is transported by transport rollers 33 to a sheet support plate 34 where the image side of the original document is placed face down. The image of the original document is then read by an image reading device 35 located below the sheet support plate 34. After the image has been read, the document is discharged by a discharge roller 36 to a discharge tray 37 provided on a front surface of the main body 10.

The image reading device 35 illuminates the image side of the original document placed on the sheet support plate 34 by a light source 38. Reflected light from the original document is reflected by mirrors 39, 40 and then gathered on a light receiving surface of a line image sensor 42 by a lens 41. In this way, the well-known process of reading line by line an image on an original document is carried out. A sheet sensor 44 is provided in the vicinity of the tip end of the sheet holder 20 for optically detecting presence of the sheet in the sheet holder 20.

The uppermost recording paper 24 stacked in the paper cassette tray 16 is taken into the recording portion 26 by a feed mechanism formed from a feed roller 51, a separation pad 52, and other components. Next, the recording paper 24 is sent to an image forming device 55 by a transport roller 53 where a toner image is formed on the recording paper 24. After the image is formed, the recording paper 24 is sent to a fixing device 56 where the toner image is thermally fixed. Thereafter, the recording paper 24 is discharged by a discharge roller 57 to a discharge tray 58 provided on a front surface of the main body 10. The fixing device 56 is a well-known unit formed from a heating roller and a pressure roller, the heating roller incorporating a heating device. The recording paper 24 is nipped between the pressure roller and the heating roller. The toner image on the recording paper 24 is fixed by heating and applying pressure to the recording paper 24.

The image forming device 55 includes a photosensitive drum 61, a laser scanner 62, a developing device 63 and a transferring device 65 with a transfer roller 64. The laser scanner 62 applies a laser beam to the photosensitive drum 61 to form an electrostatic image on the surface of the photosensitive drum 61. The developing device 63 adheres toner to the photosensitive drum 61 after the electrostatic image is formed thereon. The transferring device 65 has a transfer roller 64 and imparts electric charges to the recording paper 24 so that the toner adhered to the photosensitive drum 61 is transferred to the recording paper 24. The laser scanner 62 includes a laser source 67, a lens 68 for collecting the laser beams emitted from the laser source 67, a reflecting mirror 69. The laser source 67 emits laser beams according to commands from the control section 70. The reflecting mirror 69 orients the laser beams toward the photosensitive drum 61. As described above, the recording portion 26 is configured as a laser printer and forms an image on the recording paper 24 according to commands from the control section 70.

Figure 4:
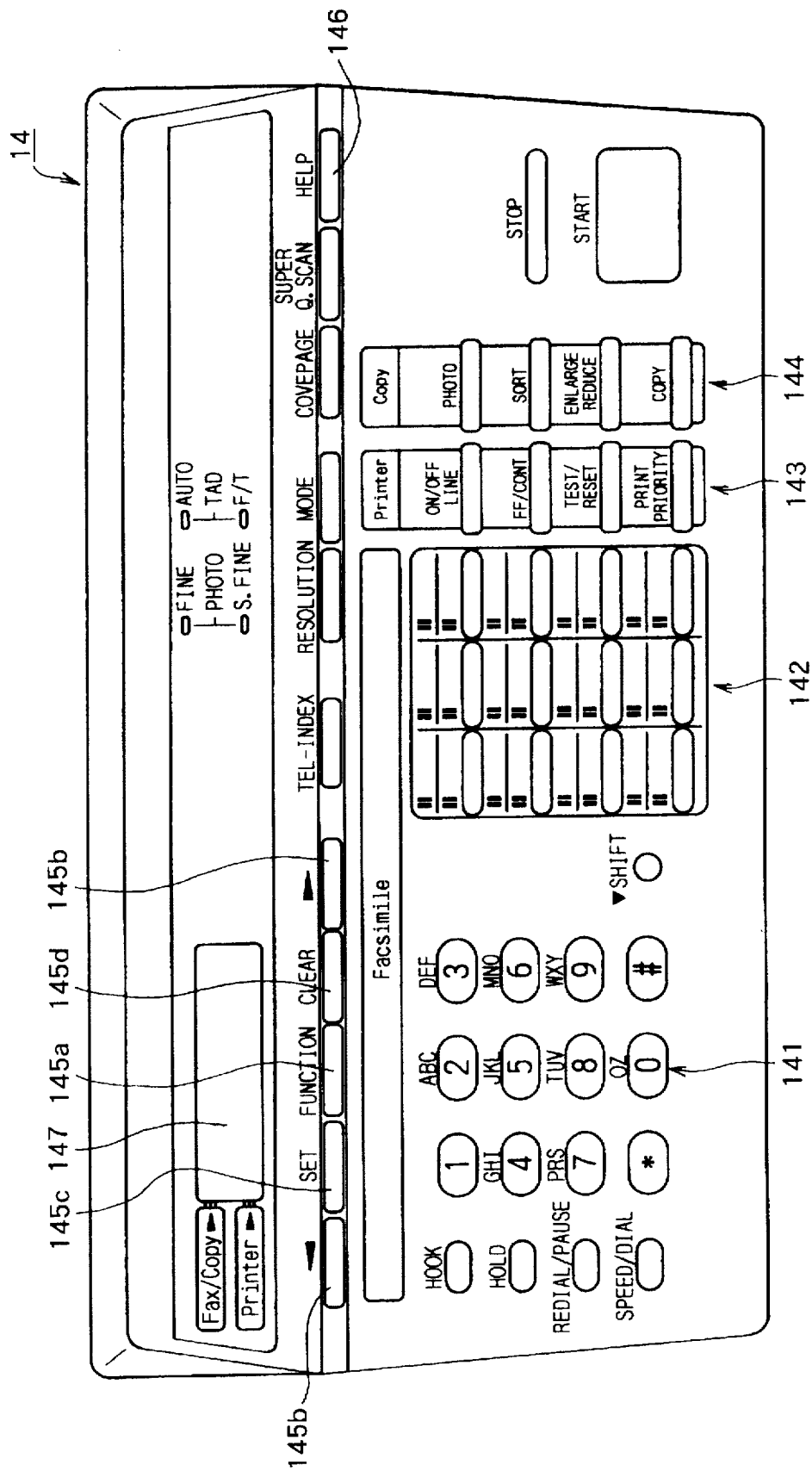
FIG. 4 is a plan view showing an operation panel configuration of a facsimile device according to the embodiment of the present invention.

The operation panel 14 is configured as shown in FIG. 4. As shown, the operation panel 14 is provided with various keyswitches including numeral keys 141, fax keys 142, printer keys 143, copy keys 144, a function key 145a, cursor keys 145b, a set key 145c, a clear key 145d and a help key 146. The operation panel 14 is also provided with a liquid crystal display 147. The numeral keys 141 are primarily used to input the fax number to be dialed. The fax keys 142 are used to give various instructions relating to the facsimile function. The printer keys 143 are used to give various instructions relating to the printer function. The copy keys 144 are used to give various instructions relating to the copier function which is a part of the facsimile function. The function key 145a is used for making various settings relating to the various kinds of functions. The help key 146 is used to designate output of a help list. The liquid crystal display 147 displays the information relating to the various functions described above. In addition, the liquid crystal display 147 is made up of two levels, an upper level and a lower level, so that different information can be displayed on each level, as will be described later.

Figure 1:
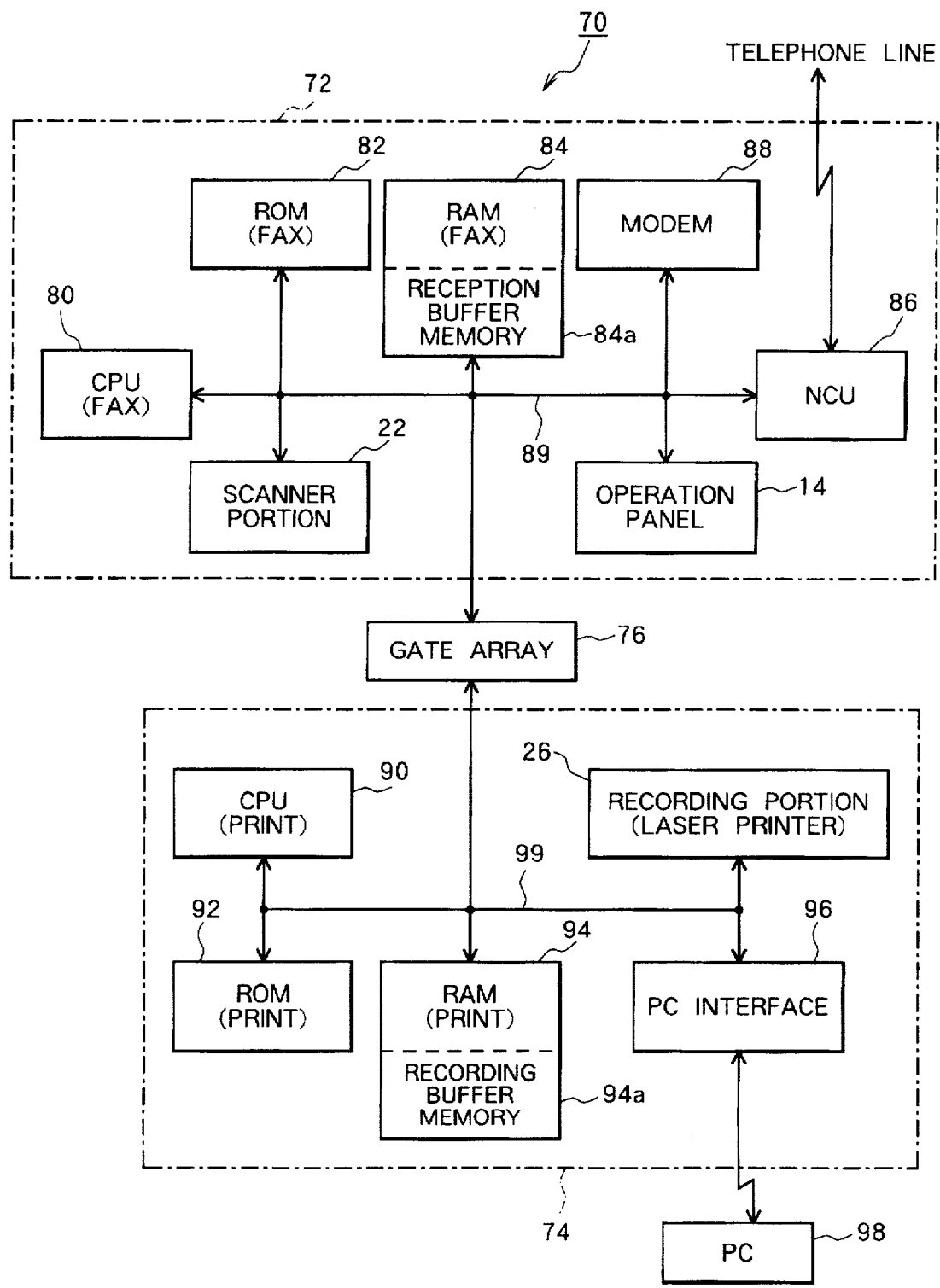
FIG. 1 is block diagram showing a circuit configuration of a facsimile device according to an embodiment of the present invention.

Next, as shown in FIG. 1, the control section 70 which controls the various parts described above includes a facsimile (fax) portion 72, a printer portion 74, and a gate array 76 connecting these portions to each other.

According to the various commands from an operator which are input via the operation panel 14, the fax portion 72 carries out setting of the operation mode, reading of the sheet image, the transmission and reception of fax data, decoding of received data, and transfer of decoded fax data to the printer portion 74. The fax portion 72 includes a CPU 80, ROM 82, RAM 84, a network control unit (NCU) 86, a modem 88, and other components. The NCU 86 allows the possibility of voice communication and the transmission and reception of fax data between another telephone or facsimile device. The modem 88 is used to transmit and receive fax data between another facsimile device via the NCU 86. The CPU 80, ROM 82, RAM 84, NCU 86, modem 88 and the operation panel 14 are mutually connected to one another by a bus 89. The gate array 76 is also connected to the bus 89. The telephone receiver 12, a speaker and other components are connected to the NCU 86 so that voice communication with another telephone can be carried out via the telephone receiver 12.

On the other hand, the printer portion 74 is used to form or print a facsimile image on a recording paper 24 by executing driving control of the recording portion 26 according to the fax data sent from the fax portion 72 via the gate array 76. Like the fax portion 72, the printer portion 74 is configured as a microcomputer having a CPU 90, ROM 92 and RAM 94 as main components. Further, a PC interface 96 is provided in the printer portion 74. When PC data is input to the PC interface 96 from an external personal computer (PC) 98, the CPU 90 executes driving control of the recording portion 26 according to the PC data and forms or prints on the recording paper 24 an image produced at the PC 98 side. Next, the CPU 90, ROM 92, RAM 94, PC interface 96, and the recording portion 26 are mutually connected to one another by a bus 99. The gate array 76 is also connected to the bus 99.

Among the various control processes executed in the fax portion 72 and the printer portion 74, the main processes involved in the present invention are a printer operation setting process, a fax data reception process, a printing process of fax data and PC data, and an error display process. These main processes will be described while referring to the flowcharts shown in FIGS. 5 to 13.

Figure 5:
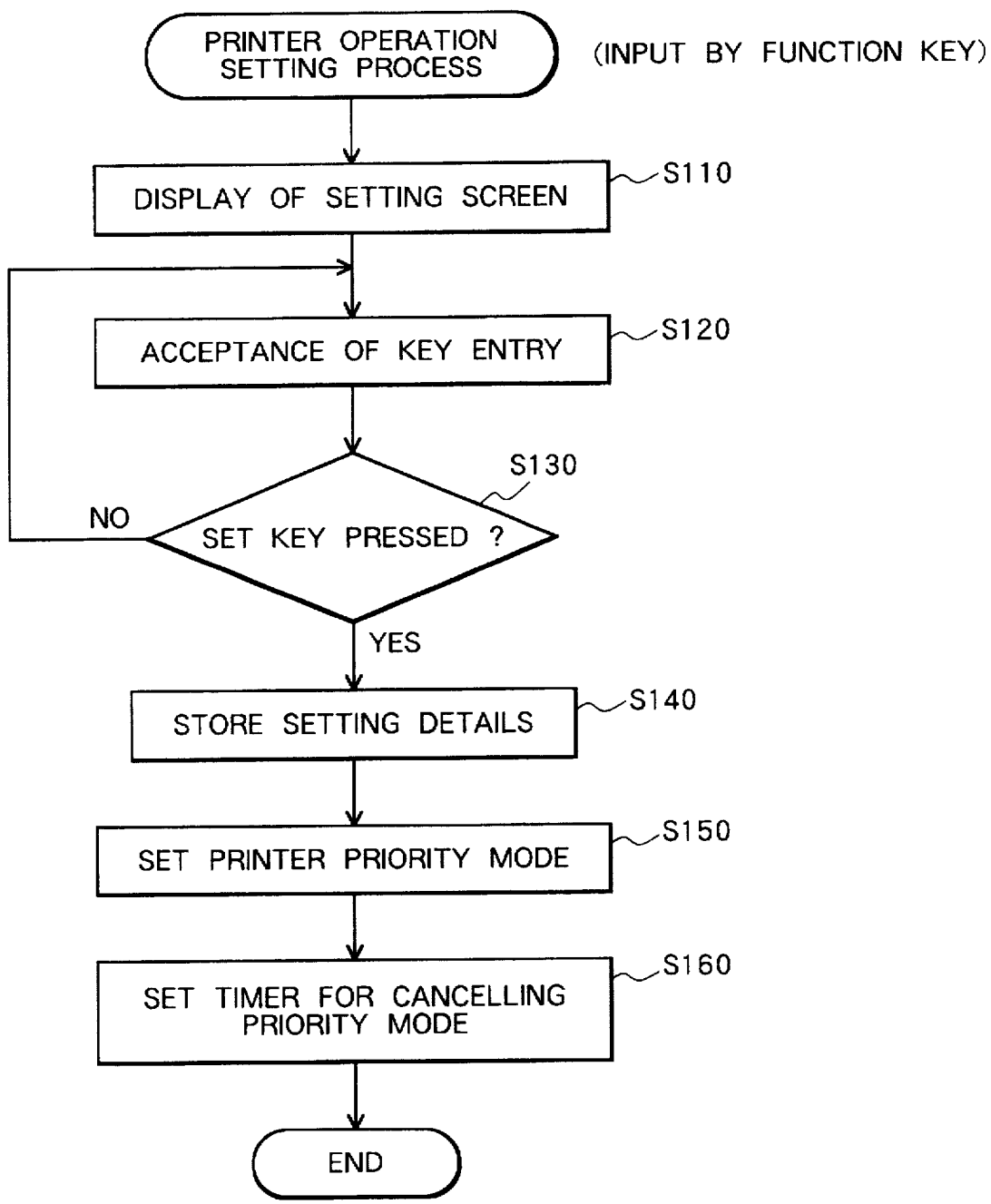
FIG. 5 is a flowchart showing a printer operation setting process.
Figure 6:
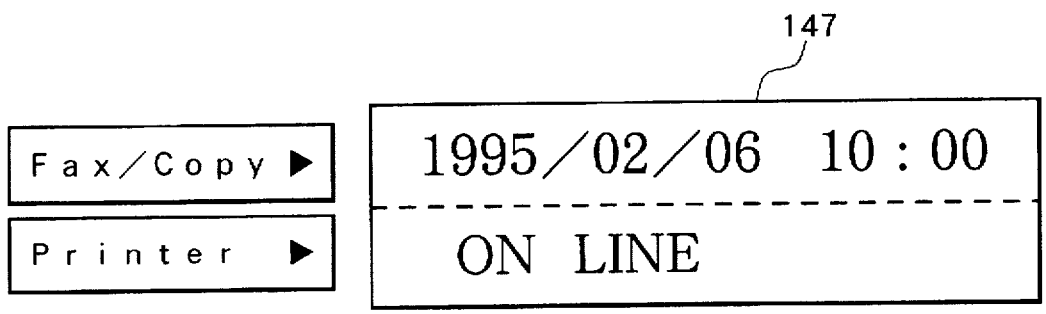
FIGS. 6(A) and 6(B) are diagrams showing examples of a display before and after the printer operation setting process.
Figure 6:
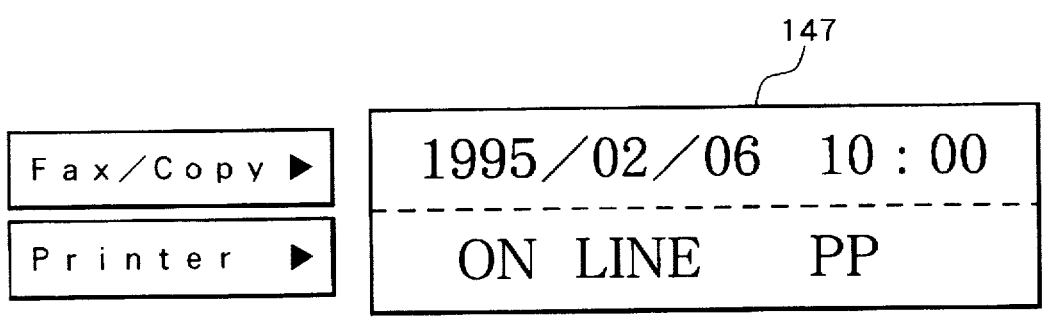

FIG. 5 is a flowchart showing a printer operation setting process for setting the control mode of the recording portion 26 provided at the printer portion 74 when printing PC data. This process is executed at the FAX CPU 80 when an operator manipulates the function key 145a of the operation panel 14 to input the printer operation setting commands.

First, as shown in FIG. 5, when the process is started, in S110 ("S" indicates "Step") a setting screen is displayed showing setting items settable in the control mode and the currently set details.

The setting screen allows selection of the following: the size of the recording paper 24, the feeding method of the recording paper 24, the printing direction of the PC data on the recording paper 24, the image resolution when printing the PC data. For each of these items, an operator is allowed to select from among the preset options. In the present embodiment, each of the setting items and selectable options for each item are displayed on the liquid crystal display 147 on the operation panel 14. The currently selected option of each setting item is highlighted. (1) Paper size: (a) Letter (8½×11 inch), (b) Legal (8½×14 inch), (c) A4 (210×297 mm) (2) Paper feeding method: (a) Automatic feed, (b) Manual feed (3) Printing direction: (a) Vertical, (b) Horizontal (4) Resolution: (a) 300 dpi, (b) 170 dpi, (c) 75 dpi In this way, when the setting screen is displayed in S110, the operator manipulates the cursor keys 145b to designate options from among each of the setting items. Then, if the setting details are in order, the operator presses the set key 145c to set the selected options. Thus, in S120, the FAX CPU 80 accepts a key entry by the operator. If the key entry changes a selected option, then the FAX CPU 80 changes the highlighted option on the display screen accordingly and executes a key entry acceptance process. In S130, the FAX CPU 80 determines whether the set key 145c has been pressed or not. If it is determined that the set key 145c has not been pressed, then the process goes to S120 again. If it is determined that the set key 145c has been pressed, then in S140 the setting details on the display screen are stored in the RAM 84. Next, in S150, printer priority mode (hereinafter referred to as "PC priority mode") is set and stored in the RAM 84. Then, in S160, a timer for canceling PC priority mode is set whereupon the printer operation setting process is terminated.

The FAX CPU 80 changes the liquid crystal display 147 before and after the setting of PC priority mode in the following way. Before PC priority mode has been set, the upper level of the liquid crystal display 147 displays the current date and time as the information pertaining to the facsimile function as shown in FIG. 6(A). Also, the lower level of the liquid crystal display 147 displays "ON LINE" indicating that PC data is able to be received or "OFF LINE" indicating that PC data is unable to be received. The information indicated in the lower level of the liquid crystal display 147 pertains to the printer function. If PC priority mode is set, then a "PP" indicating PC priority mode is displayed next to "ON LINE" (or "OFF LINE") in the lower level. This is shown in the example in FIG. 6(B).

The timer for canceling PC priority mode is set in S160 for automatically canceling PC priority mode set in S150 after a predetermined period of time (for example, 10 minutes) has elapsed. In the present embodiment, when the timer indicates that the predetermined period of time has expired, an interrupt process (not shown) is executed and PC priority mode is canceled. Then, with the cancellation of PC priority mode, the FAX CPU 80 returns the liquid crystal display 147 to the status of FIG. 6(A), for example. When the cancellation of PC priority mode has been done, the PC priority mode on/off setting and the setting details stored in the RAM 84 are transferred to the PRINT CPU 90 on the printer portion 74 and stored in the RAM 94 of the printer portion 74 so that the information stored therein can be used at the CPU 90 when executing the printing process of fax data and PC data.

Next, a fax data reception process repeatedly executed as a main routine in the FAX CPU 80 will be described while referring to the flowchart shown in FIG. 7.

Figure 7:
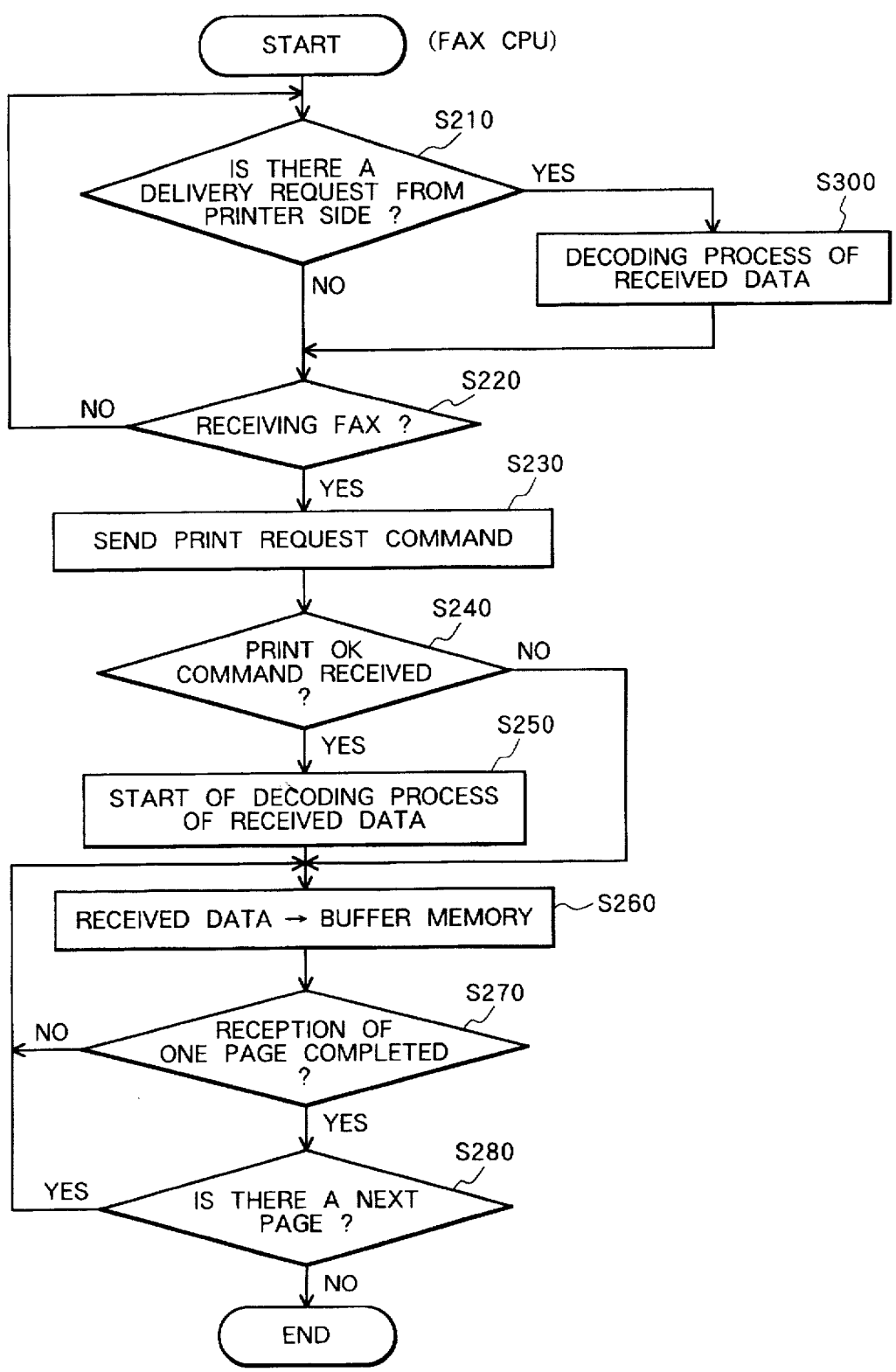
FIG. 7 is a flowchart showing a reception process of fax data.

First, as shown in FIG. 7, when the process is started, in S210 it is determined whether a received data delivery request has been sent from the printer portion 74. If there is a delivery request (S210: YES), then in S300 a decoding process of received data, which will be described later, is executed, and thereafter the process goes to S220. If there is no delivery request (S210: NO), then the process goes straight to S220. Then, in S220 it is determined whether fax data is being received by the NCU 86 and the modem 88. If fax data is being received (S220: YES), then the process goes to S230. If fax data is not being received (S220: NO), then the process goes to S210 again.

In S230, a PRINT REQUEST command is sent to the printer portion 74. In S240, it is determined whether a PRINT OK command has been received from the printer portion 74 in response to the PRINT REQUEST command. If the PRINT OK command has been received (S240: YES), then in S250 a decoding process of received data, which will be described later, is started, and thereafter the process goes to S260. If the PRINT OK command has not been received therefrom (S240: NO), meaning that the printer portion 74 is busy and thus the received data cannot be printed, then the process goes straight to S260.

In S260, the fax data received at the NCU 86 and the modem 88 is stored in a predetermined storage region (reception buffer memory 84a) in the RAM 84. In S270, it is determined whether the reception of a single page of fax data has been completed. If the reception of a single page of fax data is not completed (S270: NO), then the process goes to S260. Through this procedure, a single page of fax data is stored in the reception buffer memory 84a.

In S270, if it is determined that the reception of a single page of fax data has been completed (S270: YES), then in S280 it is determined whether a next page of fax data is being received at the NCU 86 and the modem 88. If a next page of fax data is not being received (S280: NO), then the process ends at that point. If a next page of fax data is being received, then the process goes to S260 again. The fax data for following pages is also received with the same procedure described above and is stored in the reception buffer memory 84a.

Next, the decoding process of received data executed in S300 and started in S250 will be described while referring to the flowchart shown in FIG. 8. This process is for sending the fax data stored in the reception buffer memory 84a to the printer portion 74. When the process is started in S250, execution of the decoding process is performed by way of time sharing using free time of the above-described reception process.

Figure 8:
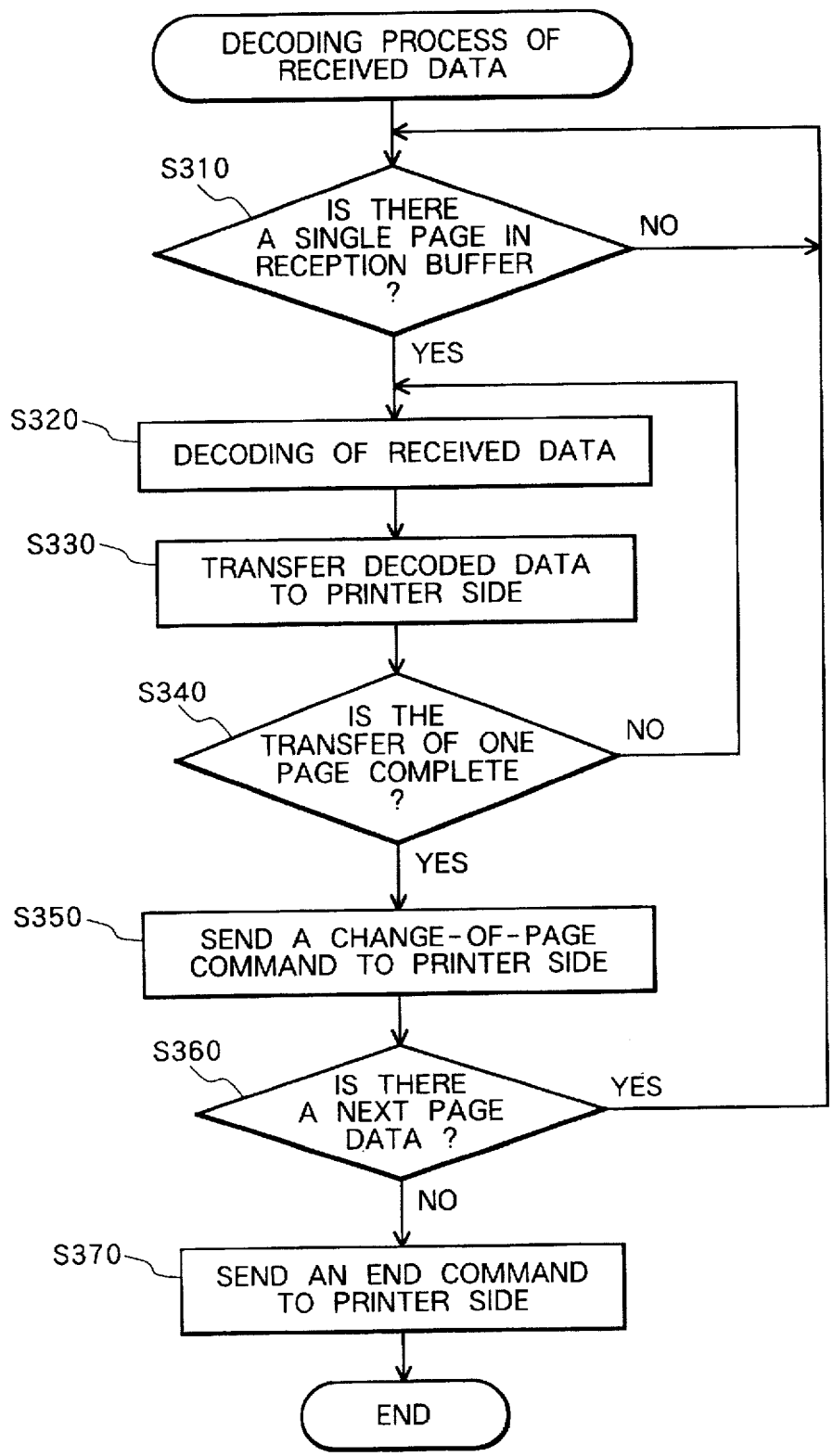
FIG. 8 is a flowchart showing a decoding process of received data.

As shown in FIG. 8, in the decoding process of received data, in S310 it is determined whether a single page of received data is stored in the reception buffer memory 84a. If a single page of received data is stored (S310: YES), then the process goes to S320. If a single page of received data is not stored (S310: NO), then the process waits until a single page of received data is stored in the reception buffer memory 84a by repeating the S310 process. When the decoding process of received data is started in S250 of the FIG. 7 flowchart, the S310 process waits for a single page of received data to be stored in the reception buffer memory 84a at S260 and subsequent steps of the process.

Next, in S320 the fax data stored in the reception buffer memory 84a is decoded into print code data (bitmap data) at a predetermined resolution (for example, 200 dpi). In S330, the decoded fax data is transferred to the printer portion 74. Then, in S340 it is determined whether the transfer of a single page of data is completed. If the transfer of a single page is not completed (S340: NO), then process goes to S320 again. In this way, the decoding and transfer of a single page of fax data is carried out.

On the other hand, if the decoding and transfer of a single page of fax data is completed (S340: YES), then in S350 a CHANGE-OF-PAGE command is sent to the printer portion 74, thereby informing the printer portion 74 that the sending of a single page of fax data is completed. Next, in S360 it is determined whether a next page of fax data to be printed remains in the reception buffer memory 84a. If a next page of fax data remains (S360: YES), then the process goes to S310 again. The following pages of fax data are also decoded and sent by means of the same procedure described above. the decoding and sending of all the fax data stored in the reception buffer memory 84a is completed (S360: NO), then this is indicated in S370 by sending an END command to the printer portion 74, thereby ending the decoding process of received data.

Figure 9:
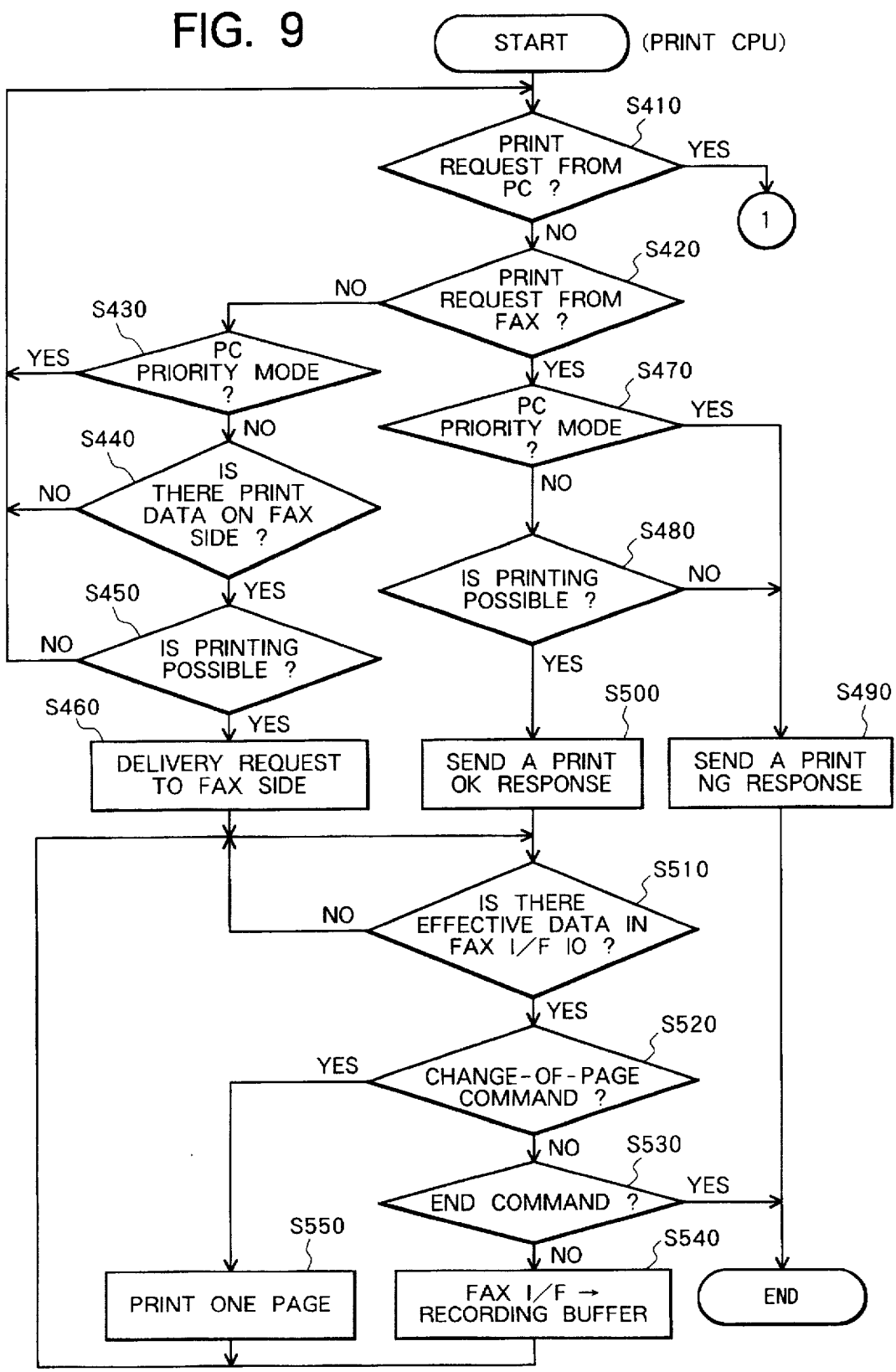
FIG. 9 is flowchart showing a portion of a data printing process.
Figure 10:
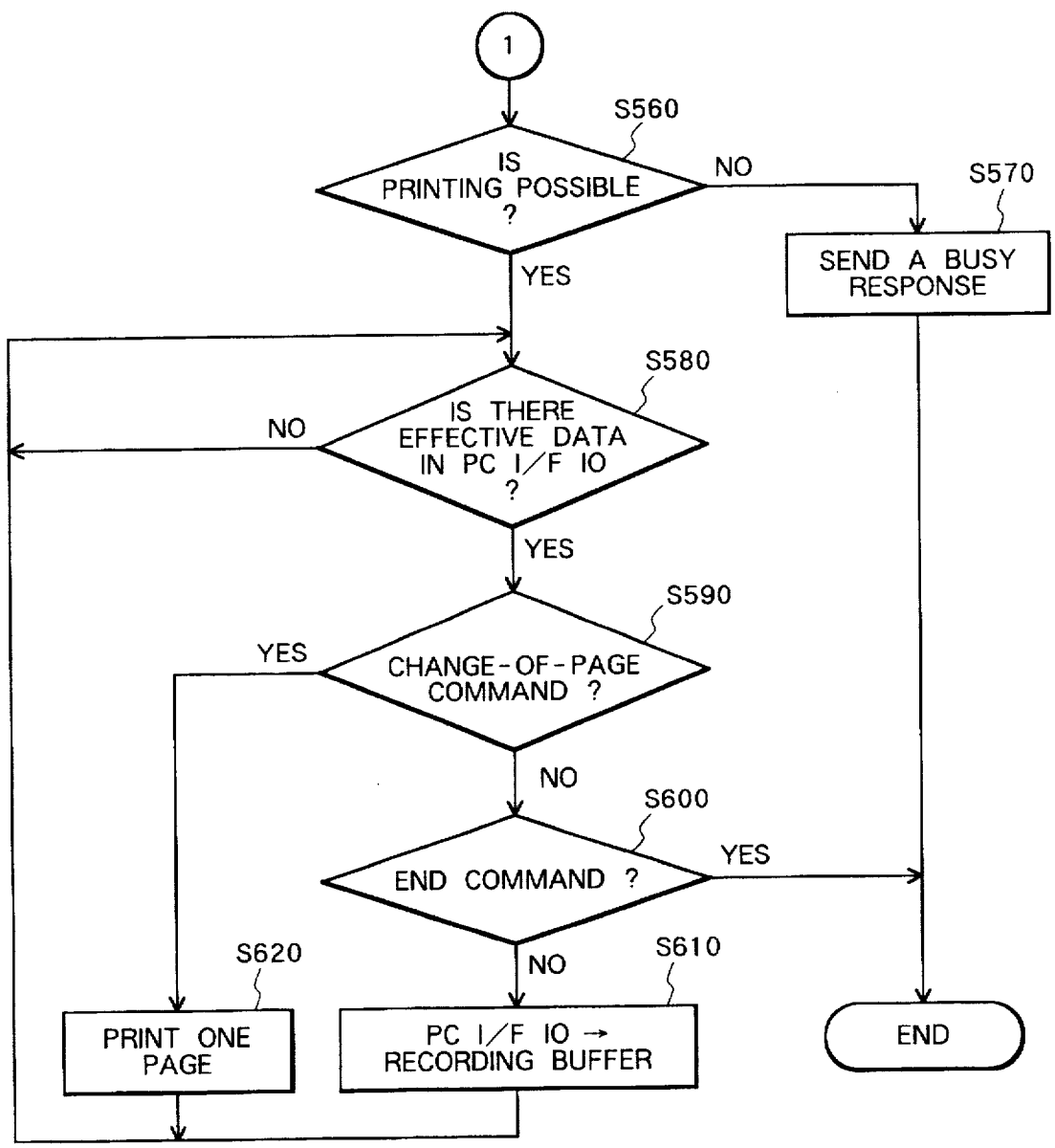
FIG. 10 is a flowchart showing the remaining portion of a data printing process.
Figure 11:
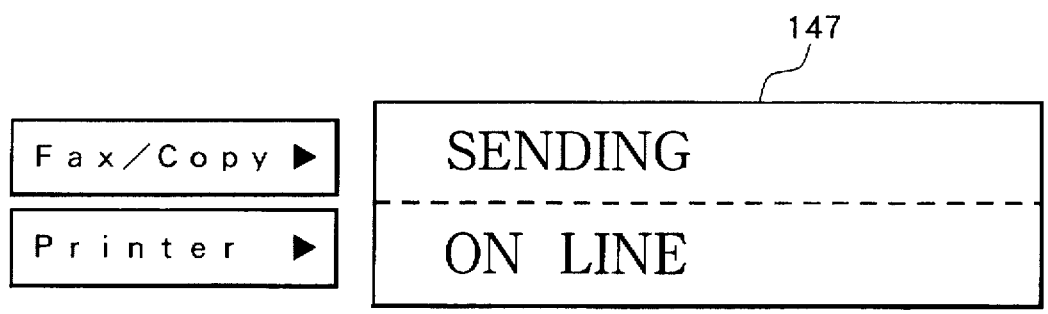
FIG. 11 is a diagram showing an example of a display during facsimile transmission.

Next, a printing process of fax data and PC data executed by the PRINT CPU 90 is described while referring the flowcharts shown in FIG. 9 and FIG. 10.

First, as shown in FIG. 9, when this process starts, in S410 it is determined whether there is a print request from the PC 98 side. If there is a print request from the PC 98 side (S410: YES), then the process goes to the PC data printing process shown in FIG. 10. On the other hand, if there is no print request from the PC 98 side (S410: NO), then in S420 it is determined whether there is a print request from the fax portion 72.

If there is no print request from the fax portion 72 (S420: NO), then the process moves to S430 where it is determined whether PC priority mode is currently set or not. If PC priority mode is currently not set (S430: NO), then in S440 it is determined whether there is fax data to be printed in the fax portion 72 by asking the fax portion 72 if there is fax data to be printed stored in the reception buffer memory 84a. Next, if there is fax data to be printed in the fax portion 72 (S440: YES), then in S450 it is determined whether the recording portion 26 is capable of print operation. If print operation is possible (S450: YES), then in S460 a delivery request is sent to the fax portion 72, and the process moves to S510. The process goes back to again in the following cases: in S430, if it is determined that PC priority mode is currently set (S430: YES); in S440, if it is determined that there is no fax data to be printed in the fax portion 72 (S440: NO); or in S450, if it is determined that the print portion 26 is in a state where print operation is not possible (S450: NO).

On the other hand, in S420 if it is determined that there is a print request from the fax portion 72 (S420: YES), then in S470 it is determined whether PC priority mode is currently set. If PC priority mode is currently set (S470: YES), then in S490 a PRINT NG command is sent to the fax portion 72 indicating that currently the fax data cannot be printed. The process then ends at that point.

In S470, if it is determined that PC priority mode is not set (S470: NO), then the process moves to S480 where is determined whether the recording portion 26 is capable of print operation. If the recording portion 26 is not capable of print operation (S480: NO), then in S490 a PRINT NG command is sent to the fax portion 72. The process then ends at that point. On the other hand, if the recording portion 26 is capable of print operation (S480: YES), then in S500 a PRINT OK command is sent to the fax portion 72. The process then goes to S510.

In S510, the PRINT CPU 90 determines whether there is effective data in the fax interface input/output port (hereinafter referred to as "FAX I/F IO") where data sent from the fax portion 72 is received via the gate array 76. Based on this, the PRINT CPU 90 waits for the fax data to be sent from the fax portion 72.

In S510, if it is determined that there is effective data in the FAX I/F IO (S510: YES), then in S520 it is determined whether the input data is a CHANGE-OF-PAGE command. If the input data is not a CHANGE-OF-PAGE command (S520: NO), then in S530 it is determined whether the input data is an END command. If the input data is not an END command (S530: NO), then in S540 the input data is stored in a recording buffer memory 94a in the PRINT RAM 94, and the process goes to S510 again. Through this procedure, the fax data sent from the fax portion 72 is successively stored in the recording buffer memory 94a of the RAM 94.

In S520, if the input data is determined to be a CHANGE-OF-PAGE command (S520: YES), this means that a single page of fax data for printing is stored in the recording buffer memory 94a of the RAM 94. Next, in S550 the recording portion 26 is driven according to the single page of fax data, forming or printing an image on the recording paper 24 corresponding to the fax data. The process then goes to S510 again. On the other hand, in S530 if it is determined that the input data is an END command (S530: YES), then there is no longer any fax data to be printed, and so the process ends at that point.

In S550, the fax data is transferred to the laser scanner 62. Laser beams are emitted from the laser scanner 62 corresponding to the data and, at the same time, the feed roller 51, transport roller 53, fixing device 56, discharge roller 57, photosensitive drum 61, developing device 63 and other components making up the recording portion 26 are each driven in synchronization. In this way, the fax data is printed.

On the other hand, in S410 if it is determined that there is a print request from the PC 98 side (S410: YES), then as shown in FIG. 10, in S560 it is determined whether the recording portion 26 is capable of print operation. If the recording portion 26 is not capable of print operation (S560: NO), then that is indicated in S570 by sending a BUSY signal to the PC 98 side, ending the process at that point.

However, if the recording portion 26 is capable of print operation (S560: YES), then in S580 the PRINT CPU 90 determines whether there is effective data in the PC interface input/output port (hereinafter referred to as "PC I/F IO") where data sent from the PC 98 is received via the PC interface 96. Based on this, the PRINT CPU 90 waits for the PC data to be sent from the PC 98.

In S580, if it is determined that there is effective data in the PC I/F IO (S580: YES), then in S590 it is determined whether the input data is a CHANGE-OF-PAGE command. If the input data is not a CHANGE-OF-PAGE command (S590: NO), then in S600 it is determined whether the input data is an END command. If the input data is not an END command (S600: NO), then in S610 the input data is stored successively in the recording buffer memory 94a in the PRINT RAM 94, and the process goes to S580 again. Through this procedure, the PC data sent from the PC 98 side is stored in the recording buffer memory 94a of the RAM 94.

To print the PC data on the recording paper 24 according to the setting details selected in the printer operation setting process, in S610 the storing of the PC data in the recording buffer memory 94a is not like S540 where the fax data is stored in the recording buffer memory 94a as it is. Instead, the PC data in code data form is expanded into bitmap data for printing using predetermined font data according to the print resolution, paper size, and printing direction set above. The data is then stored in the recording buffer memory 94a.

In S590, if the input data is determined to be a CHANGE-OF-PAGE Command (S590: YES), then this means that a single page of PC data is stored in the recording buffer memory 94a of the RAM 94. Next, in S620 the recording portion 26 is driven according to the single page of PC data, forming or printing an image on the recording paper 24 (printing) corresponding to the PC data. The process then goes to S580 again. On the other hand, in S600 if it is determined that the input data is an END command (S600: YES), then there is no longer any PC data to be printed, and so the process ends at that point.

The printing of the PC data in S620 is basically executed in the same way as the printing of the fax data in S550. However, if manual feed is set as the paper feed method selected in the printer operation setting process, then the recording paper 24 can be fed manually.

A predetermined operation of the fax keys 142 makes the FAX CPU 80 execute a well-known transmission process of sending image data read at the scanner portion 22 via a telephone line. When this happens, the FAX CPU 80 displays a "SENDING" message in the upper level of the liquid crystal display to indicate that transmission is in progress. This is shown in the example in FIG. 11. If any kind of fault occurs at the facsimile device 2, the FAX CPU 80 executes an error display process as an interrupt process to display an error message on the liquid crystal display 147. The error display process will be described next.

Figure 12:
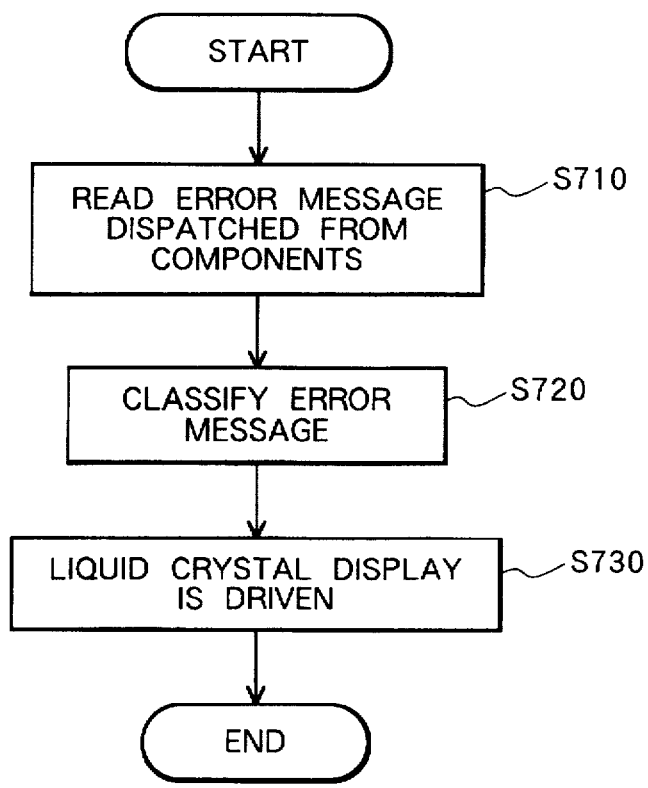
FIG. 12 is a flowchart showing an error display process.
Figure 13:
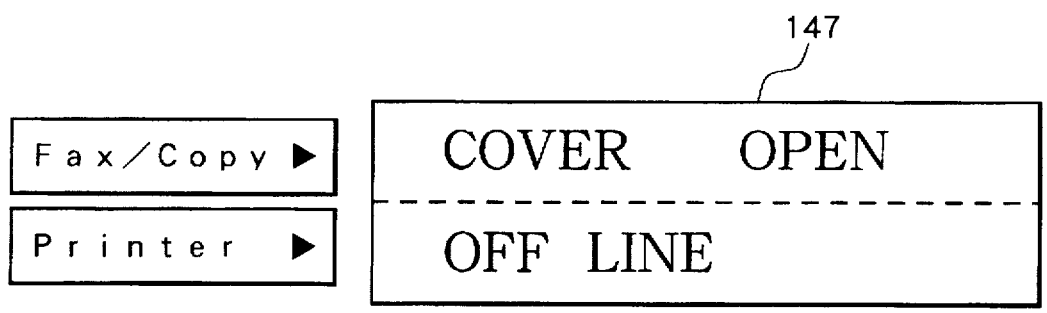
FIGS. 13(A) and 13(B) are diagrams showing examples of an error message display.
Figure 13:
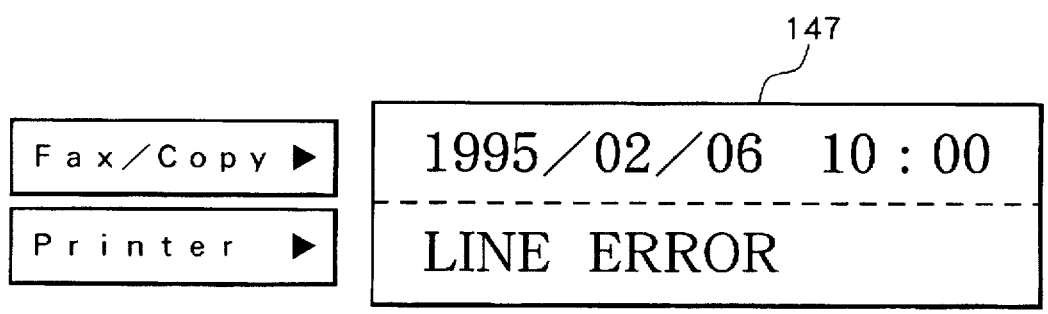

FIG. 12 is a flowchart showing the error display process. First, when this process starts, in S710 an error message input from the CPU, sensors or other components in any of the portions of the facsimile device 2 (hereinafter uniformly referred to as "error message") is read. Next, in S720 the error message is classified as either a message common to both the facsimile function and the printer function or particular to only the printer function. Based on this, the error message is then stored in a different region in FAX RAM 84. For example, if an error message indicating that the cover of the facsimile device 2 is open is input from a sensor installed in the vicinity of the cover, then the error message is stored as an error message common to both functions. Also, if an error message indicating that data from the PC 98 has not been received in its entirety is input from the printer portion 74, then the error message is stored as an error message particular to the printer function.

The process then goes to S730 where the liquid crystal display 147 is driven in the following way, ending the process at that point. That is, an error message common to both functions is displayed in the upper level of the liquid crystal display 147, while an error messages particular only to the printer function is displayed in the lower level of the liquid crystal display 147. For example, if the cover of the facsimile device 2 is open, then it is indicated by an error message "COVER OPEN" displayed in the upper level as shown in FIG. 13(A). In addition, if the cover is open, then the printer function automatically becomes a status of "OFF LINE." Next, if the cover is closed, then the error message "COVER OPEN" is replaced by a display of the time and date, and the lower level display returns to "ON LINE." If data is not received in its entirety from the PC 98, then it is indicated by an error message "LINE ERROR" displayed in the lower level as shown in FIG. 13(B).

In addition, other error messages common to both functions include "PRINTER JAM", indicating that the recording paper 24 is jammed. Error messages particular only to the printer function include "DOWNLOAD FULL", indicating that the storage region in RAM 94 has become full. Also, error messages particular to only the fax function include "MEMORY FULL", indicating that the RAM 84 has become full while memory transmission was in progress. Such error messages are also displayed on the upper level.

As described above, in the present embodiment, information pertaining to the facsimile function is displayed in the upper level of the liquid crystal display 147, and information pertaining to the printer function is displayed in the lower level of the liquid crystal display 147. This is shown in the examples in FIG. 6 and FIG. 12. In addition, each of information messages is displayed in letters. Further, error messages common to both functions are displayed in the upper level of the liquid crystal display 147, and error messages particular to only the printer function are displayed in the lower level. This is shown in the example in FIG. 13. In addition, each of the error messages is displayed in letters. As a result, it is possible to easily understand which function the information or error messages (hereinafter collectively referred to as "information") pertains to based on the level that the information is displayed. In addition, all the information is displayed in letters in the liquid crystal display 147. This makes the information details easy to understand.

Therefore, the liquid crystal display 147 of the present embodiment is capable of displaying information pertaining to the facsimile function and printer function so that the information details and which function the information corresponds to is easy to understand. In addition, in the present embodiment, general information and error messages are displayed in a different way due to the following reason. That is, error messages particular to only the facsimile function are extremely few when compared to error messages common to both functions and error messages particular only to the printer function. Therefore, the above-described classification method of information messages is more logical.

Further, in the present embodiment, a single liquid crystal display 147 divided into a top and bottom portion is used. However, two liquid crystal displays may be used. For example, one display may be used for information pertaining to the facsimile function, and the other display may be used for information pertaining to the printer function. However, in the present embodiment, in comparison to this case, the following effects result.

That is, in the present embodiment, by only providing a single liquid crystal display 147, the configuration of the device is simplified. In addition, the basic process for driving the liquid crystal display 147 can be shared by the upper level and lower level, while the process involving the display details of the upper level and lower level may be executed separately. As a result, the display process is also simplified. Therefore, it is possible to simplify to an even greater degree the configuration and processes of the facsimile device 2.

Still further, in the present embodiment, the fax portion 72 and the printer portion 74 are each controlled by separate CPU 80, 90. As a result, the processing speed of the facsimile device 2 as a whole is improved, and the display process by the liquid crystal display 147 is made faster. Therefore, the above-described information can be understood at an even faster rate.

In the present embodiment described above, each of the following components are equivalent: except for the printer keys 143 and the liquid crystal display 147 of the operation panel 14, the fax portion 72 and the facsimile function portion; the printer portion 74 and the printer function portion; the liquid crystal display 147 upper level and a first display means; the liquid crystal display 147 lower level and a second display means; the FAX CPU 80 and a first control means; and the PRINT CPU 90 and a second control means.

The present invention is not limited to the embodiment described above, and it would be apparent to those skilled in the art that various changes and modifications may be made therein without departing from the spirit of the invention. For example, in the above embodiment, the fax portion 72 and the printer portion 74 are provided with separate CPU 80, 90. However, each of the portions 72, 74 may be controlled by a single CPU. Also, various classification methods of the information displayed in the upper level and lower level of the liquid crystal display 147 can be devised other than those described above. For example, the error messages may be displayed so that the information pertaining to the facsimile function is in the upper level and the information pertaining to the printer function is in the lower level in the same way as the other information. In this case, error messages common to both functions are displayed simultaneously in both the upper level and lower level of the liquid crystal display 147. Further, information pertaining to the facsimile function may be displayed in the upper level and information common to both functions in the lower level. Still further, in the display methods described above, the upper level display and the lower level display may be switched.

What is claimed is:

1. A device having both a facsimile function and a printer function, comprising:

a recorded section having an input for receiving data to be recorded on a recording sheet;

a facsimile section communicatable with a remote facsimile device, said facsimile section receiving facsimile data from the remote facsimile device and applying the facsimile data to the input of said recording section to record the facsimile data on the recording sheet;

a printer section operatively connected to an external device, said printer section receiving print data from the external device and applying the print data to the input of said recording section to record the print data on the recording sheet; and a single display unit separated into a plurality of display regions including a first display region and a second display region, the first display region displaying selected one of plural pieces of information including first information about operations pertaining to said facsimile section, second information about operations pertaining to said printer section, and third information about operations common to both said facsimile sections and said printer section, the second display region displaying any one of the non-selected plural pieces of information as a result of selection for said first display region.

2. A device according to claim 1, wherein the first information contains a predetermined number of information pieces corresponding to the operations pertaining to said facsimile section, the second information contains a predetermined number of information pieces corresponding to the operations pertaining to said printer section, and the third information contains a predetermined number of information pieces corresponding to the operations common to both said facsimile section and said printer section.

3. A device according to claim 2, wherein said single display unit comprises a liquid crystal display.

4. A device according to claim 2, wherein information displayed in said plurality of display regions are represented by at least one of letters and symbols.

5. A device according to claim 1, further comprising sensing means for sensing the operations of said facsimile section and said printer section, and wherein information displayed in said plurality of display regions include statuses of said facsimile section and said printer section and error messages corresponding to operational errors of said facsimile section and said printer section.

6. A device having both a facsimile function and a printer function, comprising:

a recording section having an input for receiving data to be recorded on a recording sheet;

a facsimile section communicatable with a remote facsimile device, said facsimile section receiving facsimile data from the remote facsimile device and applying the facsimile data to the input of said recording section to record the facsimile data on the recording sheet;

a printer section operatively connected to an external device, said printer section receiving print data from the external device and applying the print data to the input of said recording section to record the print data on the recording sheet;

storage means for separately storing plural pieces of information including first information about operations pertaining to said facsimile section, second information about operations pertaining to said printer section, and third information about operations common to both said facsimile section and said printer section;

a single display unit separated into a plurality of display regions including a first display region and a second display region; and control means for controlling said plurality of display regions to display selected one of the plural pieces of information in said first display region and to display non-selected ones of said plural pieces of information as a result of selection for said first display region in said second display region, based on the plural pieces of information stored in said storage means.

7. A device according to claim 6, further comprising sensing means for sensing operational errors of said facsimile section and said printer section, and wherein information displayed in said plurality of display regions are error messages corresponding to operational errors of said facsimile section and said printer section.

8. A device according to claim 7, wherein said control means discriminates error messages vis-a-vis the plural pieces of information prior to storing the error messages in said storage means.

9. A device according to claim 8, wherein the first information contains a predetermined number of error messages corresponding to the operations pertaining to said facsimile section, the second information contains a predetermined number of error messages corresponding to the operations pertaining to said printer section, and the third information contains a predetermined number of error messages corresponding to the operations common to both said facsimile section and said printer section.

10. A device according to claim 9, wherein error messages displayed in said plurality of display regions are represented by at least one of letters and symbols.

11. A device according to claim 10, wherein said single display unit comprises a liquid crystal display.

12. A device having both a facsimile function and a printer function, comprising:

a recording section having an input for receiving data to be recorded on a recording sheet;

a facsimile section communicatable with a remote facsimile device, said facsimile section receiving facsimile data from the remote facsimile device and applying the facsimile data to the input of said recording section to record the facsimile data on the recording sheet;

a printer section operatively connected to an external device, said printer section receiving print data from the remote facsimile device and applying the facsimile data to the input of said recording section to record the facsimile data on the recording sheet;

a single display unit separated into a plurality of display regions including a first display region and a second display region, the first display region displaying selected one of plural pieces of information including first information about operations pertaining to said facsimile section, second information about operations pertaining to said printer section, and third information about operations common to both said facsimile section and said printer section, the second display region displaying any one of the non-selected plural pieces of information as a result of selection for said first display region, wherein said plurality of display regions display information simultaneously.

13. A device according to claim 12, wherein the first information contains a predetermined number of information pieces corresponding to the operations pertaining to said facsimile section, the second information contains a predetermined number of information pieces corresponding to the operations pertaining to said printer section, and the third information contains a predetermined number of information pieces corresponding to the operations common to both said facsimile section and said printer section.

14. A device according to claim 13, wherein said single display unit comprises a liquid crystal display.

15. A device according to claim 13, wherein information displayed in said first display region and said second display region are represented by at least one of letters and symbols.

16. A device according to claim 12, further comprising sensing means for sensing the operations of said facsimile section and said printer section, and wherein information displayed in said first display region and said second display region include statuses of said facsimile section and said printer section and error messages corresponding to operational errors of said facsimile section and said printer section.

17. A device having both a facsimile function and a printer function, comprising:

- a recording section having an input for receiving data to be recorded on a recording sheet;
- a facsimile section communicatable with a remote facsimile device, said facsimile section receiving facsimile data from the remote facsimile device and applying the facsimile data to the input of said recording section to record the facsimile data on the recording sheet;
- a printer section operatively connected to an external device, said printer section receiving print data from the external device and applying the print data to the input of said recording section to record the print data on the recording sheet;
- storage means for separately storing plural pieces of information including first information about operations pertaining to said facsimile section, second information about operations pertaining to said printer section, and third information about operations common to both said facsimile section and said printer section;
- a single display unit separated into a plurality of display regions including a first display region and a second display region; and
- control means for controlling said plurality of display regions to display selected one of the plural pieces of information in said first display region and to display non-selected ones of the plural pieces of information as a result of selection for said first display region in said second display region, based on the plural pieces of information stored in said storage means, wherein said plurality of display regions display information simultaneously.

18. A device according to claim 17, further comprising sensing means for sensing operational errors of said facsimile section and said printer section, and wherein information displayed in said first display region and in said second display region are error messages corresponding to operational errors of said facsimile section and said printer section.

19. A device according to claim 18, wherein said control means discriminates error messages vis-a-vis the three kinds of information prior to storing the error messages in said storage means.

20. A device according to claim 19, wherein the first information contains a predetermined number of error messages corresponding to the operations pertaining to said facsimile section, the second information contains a predetermined number of error messages corresponding to the operations pertaining to said printer section, and the third information contains a predetermined number of error messages corresponding to the operations common to both said facsimile section and said printer section.

21. A device according to claim 20, wherein error messages displayed in said first display region and said second display region are represented by at least one of letters and symbols.

22. A device according to claim 21, wherein said single display unit comprises a liquid crystal display.

* * * * *